(12) United States Patent
Pais

(10) Patent No.: US 10,135,366 B2
(45) Date of Patent: Nov. 20, 2018

(54) ELECTROMAGNETIC FIELD GENERATOR AND METHOD TO GENERATE AN ELECTROMAGNETIC FIELD

(71) Applicant: Salvatore Pais, Leonardtown, MD (US)

(72) Inventor: Salvatore Pais, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 753 days.

(21) Appl. No.: 14/807,943

(22) Filed: Jul. 24, 2015

(65) Prior Publication Data

US 2017/0025935 A1     Jan. 26, 2017

(51) Int. Cl.

| | |
|---|---|
| *H01L 41/113* | (2006.01) |
| *H02N 11/00* | (2006.01) |
| *B64G 1/52* | (2006.01) |
| *B64G 1/66* | (2006.01) |
| *B64G 99/00* | (2009.01) |
| *H02N 99/00* | (2006.01) |

(52) U.S. Cl.
CPC ............ *H02N 11/002* (2013.01); *B64G 1/52* (2013.01); *B64G 1/66* (2013.01); *B64G 9/00* (2013.01); *H02N 99/00* (2013.01)

(58) Field of Classification Search
CPC ... B64G 1/66; B64G 9/00; B64G 1/52; H02N 99/00; H02N 11/002; H02N 9/00
USPC .................................................. 310/339, 369
See application file for complete search history.

(56) References Cited

U.S. PATENT DOCUMENTS

| | | | |
|---|---|---|---|
| 7,080,504 B2 | 7/2006 | Pais | |
| 2006/0017390 A1* | 1/2006 | Moore | ................. H02N 11/002 315/149 |
| 2017/0313446 A1* | 11/2017 | Pais | ...................... B64G 1/409 |

OTHER PUBLICATIONS

Murdoch, et al, Electrostatic Tractor for Near Earth Object Deflection, 59th International Astronautical Congress, Paper IAC-08-A3.I.5.
Gonzaga, Electrostatic Deflection of Asteroids, Intn'l Journal of Applied Science and Technology, Dec. 2012, 92-95, vol. 2, No. 10.

(Continued)

*Primary Examiner* — Thomas Dougherty
(74) *Attorney, Agent, or Firm* — Mark O. Glut; NAWCAD

(57) ABSTRACT

The electromagnetic field generator includes a shell, an electrostatic generator, a power plant, a thermoelectric generator, and an electric motor. The shell has embedded polycrystalline ferroelectric ceramic material which is polarized such that the ceramic material exhibits strong Piezoelectric Effect properties thus inducing high frequency vibrations. The shell may be further doped with radioactive elements which under high frequency vibrations induce gamma ray emission. The electrostatic generator is for charging up the shell and is disposed within the shell. The power plant is to generate thermal power, and is disposed within the sphere. The thermoelectric generator is to convert the thermal power generated by the power plant to electrical energy. The electric motor powered by the electrical energy generated by the thermoelectric generator, and supplies input voltage such that the shell spins at high angular speeds, vibrates at high frequencies, and generates an electromagnetic field.

12 Claims, 2 Drawing Sheets

(56) References Cited

OTHER PUBLICATIONS

Brady, et al, Anomalous Thrust Production from an RF Test Device Measured on a Low-Thrust Torsion Pendulum, Propulsion and Energy Forum, Jul. 28-30, 2014, 1-21, Cleveland, OH.
Hinterberger, Electrostatic accelerators, Helmholz-Institut fur Strahlen- und Kernphysik, University of Bonn, Germany.
Bergstresser, et al, Embedded Capacitance Materials and Their Application in High Speed Designs, IPC Printed Circuits Expo, Mar. 23-27, 2003, Long Beach, CA.
Shung, et al, Piezoelectric materials for high frequency medical imaging applications: A review, NIH Resource, Feb. 21, 2007, Los. Angeles, CA.
Sanjurjo-Rivo, et al, Asteroid Deflection by Means of Electromagnetic Forces During an Earth Flyby, ESA, Boulder, CO.
Drews, et al, Electric Winds driven by the time oscillating corona discharges, Journal of Applied Physics, 2013, 114.
Giovanelli, et al, Zero-point Oscillations and Mossbauer Effect, University di Parma, 2001, 56-60, 131, Milano, Italy.
Pais, Salvatore, The Ultrahigh Intensity Electromagnetic Field Generator—Optimal Asteroid Deflector.
Pais, Salvatore, The high energy electromagnetic field generator, Int. J. Space Science and Engineering, 2015, vol. 3, No. 4.

\* cited by examiner

ELECTROMAGNETIC FIELD GENERATOR AND METHOD TO GENERATE AN ELECTROMAGNETIC FIELD

STATEMENT OF GOVERNMENT INTEREST

The invention described herein may be manufactured and used by or for the Government of the United States of America for governmental purposes without payment of any royalties thereon or therefor.

BACKGROUND

To date there are more than 100,000 potentially dangerous asteroids (Near Earth Objects) which cross the earth's orbit, with only 11,000 having been cataloged and currently tracked. Earth will be impacted again and again; it is only a matter of time and circumstance. Therefore, there is a need for an effective method to deflect or destroy these potentially dangerous asteroids.

Currently, several methods of asteroid deflection have been suggested. They include an electrostatic tractor, which utilizes two continuous voltage sources (20 kV each) placed on both a spacecraft and the asteroid itself (one source to each), and would use the produced electrostatic fields to either slowly attract or repel the asteroid, and a gravity tractor which would park a spacecraft close enough to the asteroid so that the gravitational attraction would in time affect its trajectory. Other methods suggested include possibly utilizing the earth's magnetic field (electrodynamic tethers) with an electrostatic tractor for further deflection capability, or shooting white paint pellets at the asteroid making it pale enough to couple with the solar radiation in a high reflectivity/photonic momentum 'push' mode. The kinetic method of deflection has also been suggested. This deflection method would propel a sizeable craft into a tangential trajectory to the asteroid, impacting it with a 10 km/s relative velocity (thus adding to its angular momentum and creating a deflecting spin). Thermonuclear warheads may also be used to destroy the incoming asteroid, which may, however, result in fragmentation and thermonuclear pollution.

The techniques described above would only affect "small" asteroids, on the average diameter levels of approximately 100 meters. Also, these deflection methods would need a great deal of time to affect the desired outcomes (10 to 20 years have been suggested), with the exception of the kinetic method, which has issues in accuracy of targeting and subsequent impact effectiveness.

There are four known fundamental forces which control matter and therefore control energy, namely strong nuclear force, weak nuclear force, electromagnetic force, and gravitational force. In this hierarchy of forces, the electromagnetic force is perfectly positioned to be able to manipulate the other three. A stationary electric charge gives rise to an electric (electrostatic) field, while a moving charge generates both an electric and a magnetic field (hence the electromagnetic field). Additionally, an accelerating charge induces electromagnetic radiation in the form of transverse waves, namely light. Mathematically, as well as physically, electromagnetic field intensity can be represented as the product of electric field strength and magnetic field strength. Electromagnetic fields act as carriers for both energy and momentum, thus interacting with physical entities at the most fundamental level (in this manner addressing the feasibility of countering the Earth-bound Asteroid Threat).

Artificially generated high energy electromagnetic fields interact strongly with the Vacuum Energy Field (an aggregate state composed of the superposition of all quantum fields' fluctuations permeating the fabric of Spacetime), thereby giving rise to Emergent Physical Phenomena (in other words revolutionary physics), such as Force and Matter Fields Unification. According to Quantum Field Theory, this strong interaction between the fields is based on the mechanism of transfer of vibrational energy between the fields, further inducing local fluctuations in adjacent quantum fields which permeate Spacetime (these fields may or may not be electromagnetic in nature).

Everything that surrounds us, ourselves included, can be described as macroscopic collections of fluctuations, vibrations, and/or oscillations in quantum mechanical fields. Therefore, under certain conditions (such as the coupling of hyper-frequency axial spin with hyper-frequency vibrations of electrically charged systems) the rules and special effects of quantum field behavior also apply to macroscopic physical entities. Along this line of thought, lightning can be explained as a Macroscopic Quantum Phenomenon which arises due to millions of ice particle collisions within storm clouds (thus giving rise to a sizeable electric charge), which generate electromagnetic fields locally interacting with the Vacuum Energy Field. Thus, the physics of lightning can be explained by extremely strong interactions between classical electromagnetic fields (storm clouds exhibiting 100 MV voltages and rapid air currents) and the quantum fields' superposition-induced Vacuum Energy Field.

Moreover, simultaneous coupling of hyper-frequency gyrational (axial rotation) and hyper-frequency vibrational electrodynamics (as used in the inventive concept herein disclosed) is conducive to a possible physical breakthrough (Force and Matter Fields Unification is feasible with the concept at hand) in the utilization of the Quantum Vacuum Plasma (part of the Vacuum Energy Field) as an energy source (or sink), an induced physical phenomenon, for which the technology readiness level has been considerably advanced by a team of research engineers from NASA JSC. Their research involves the use of high Radio frequency/ Microwave driven resonant cavity Q-thruster technology within the context of Quantum Vacuum Plasma physics.

SUMMARY

The present invention is directed to an electromagnetic field generator and a method to generate an electromagnetic field with the needs enumerated above and below.

The present invention is directed to an electromagnetic field generator which includes a shell, an electrostatic generator, a power plant, a thermoelectric generator, and an electric motor. The shell has embedded polycrystalline ferroelectric ceramic material, which is polarized such that the ceramic material exhibits strong Piezoelectric Effect properties thus inducing high frequency vibrations. The electrostatic generator is for charging up the shell and is disposed within the shell. The power plant is to generate thermal power, and is disposed within the shell. The thermoelectric generator is to convert the thermal power generated by the power plant to electrical energy. The electric motor is powered by the electrical energy generated by the thermoelectric generator, and supplies input voltage such that the shell spins at high angular speeds, vibrates at high frequencies, and generates an electromagnetic field.

It is a feature of the present invention to provide a method and apparatus for deflecting or destroying a large asteroid and preventing a possible collision with earth. The present invention may also deflect or destroy any other type of object.

It is a feature of the present invention to provide a method and apparatus for generating an impenetrable defensive shield to Sea and Land as well as Space-based military and civilian assets, protecting these assets from such threats as Anti-Ship Ballistic Missiles, Radar Evading Cruise Missiles, Top Attack for Main Battle Tanks (land and sea based systems), as well as counteracting the effects of solar-induced Coronal Mass Ejections or defending critical military satellites in an ASAT role (space based system). Furthermore, the design of energy generation machinery with power output levels much higher than those currently achievable by conventional means, is made possible with this invention. There is a particularly interesting electromechanical analogy to aid in understanding how the present concept works as a shield. Think of an umbrella with 'aluminized' canvas, which is rapidly rotated and 'pulsated' (by opening it all the way and then closing it slightly, in rapid succession), while at the same time charging the canvas from a portable DC voltage source. An arrow or bolt shot into the umbrella will be deflected readily, not only due to the momentum of coupled rapid rotation and pulsation but also due to the additional electromagnetic field induced 'punch' provided by the electrified canvas.

DRAWINGS

These and other features, aspects and advantages of the present invention will become better understood with reference to the following description and appended claims, and accompanying drawings wherein FIG. 1 is a cross-sectional side view of an electromagnetic field generator utilizing a spherical shell;

DESCRIPTION

Figure 1:
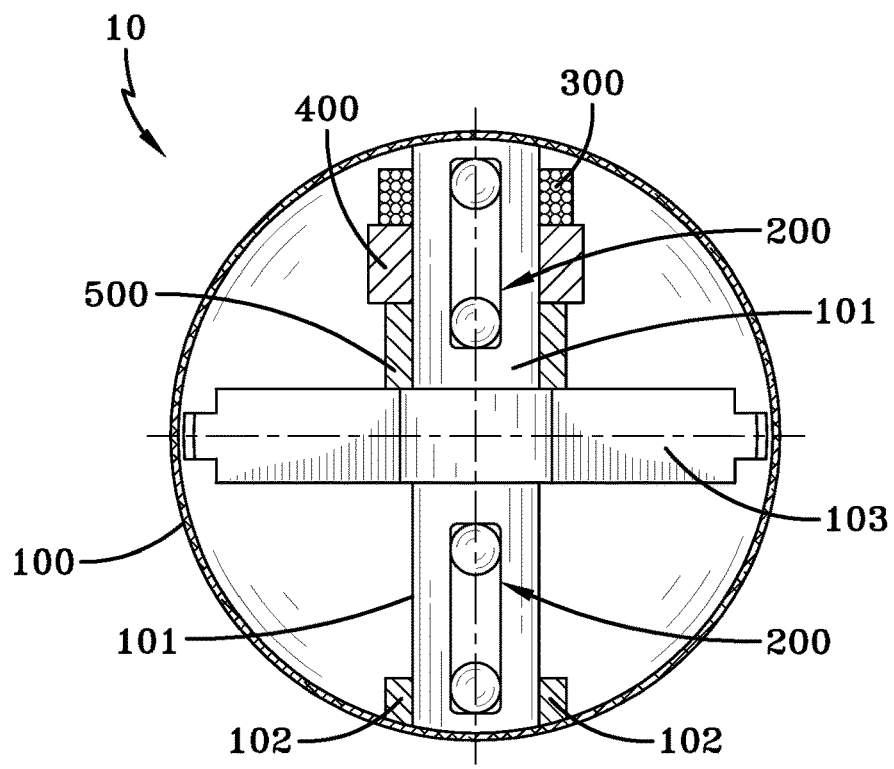

The preferred embodiments of the present invention are illustrated by way of example below and in FIGS. 1-4. The high energy electromagnetic field generator 10 includes a shell 100, an electrostatic generator 200, a nuclear pebble bed reactor 300 (a power plant), a thermoelectric generator 400, and an electric motor 500. The shell 100 has embedded polycrystalline ferroelectric ceramic material which is polarized such that the ceramic material exhibits strong Piezoelectric Effect properties thus inducing high frequency vibrations. It is important to decouple the shell's Piezoelectric vibrational frequency from any natural resonant frequency of the system's structural framework, which may cause diminution of structural integrity and possibly lead to destruction of the system. The electrostatic generator 200 is for charging up the shell 100 and is disposed within the shell 100. The nuclear fission pebble bed reactor 300 is to generate thermal power, and is disposed within the shell 100. The thermoelectric generator 400 is to convert the thermal power generated by the nuclear fission pebble bed reactor 300 to electrical energy. The electric motor 500 is powered by the electrical energy generated by the thermoelectric generator 400, and supplies input voltage such that the shell 100 spins at high angular speeds, vibrates at high frequencies, and generates an electromagnetic field.

In the description of the present invention, the invention will be discussed in a space, sea, or terrestrial environment; however, this invention can be utilized for any type of application that requires use of electromagnetic field generator.

Figure 2:
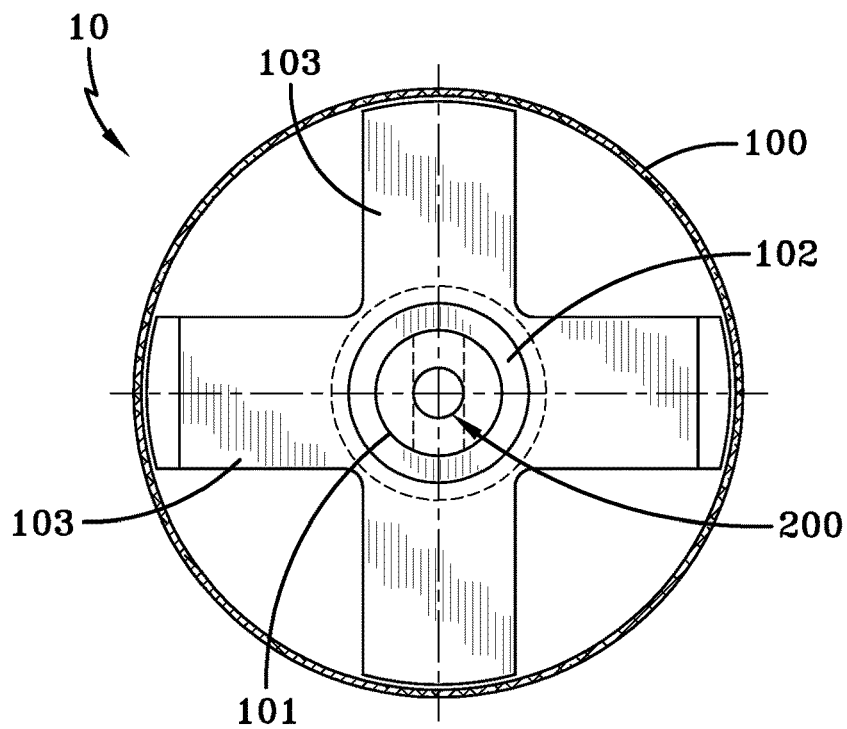
FIG. 2 is a cross-sectional bottom view of an electromagnetic field generator utilizing a spherical shell.

The shell 100 may be spherical, hemispherical, or a disc. The spherical shell 100, shown in FIGS. 1 and 2, may be used when utilizing the apparatus in space (space based system). The hemispherical shell 105, shown in FIG. 3, may be utilized at sea (sea based system), while the disc shell 110, shown in FIG. 4, may be utilized on land (terrestrial system). As shown in FIGS. 1 and 2, in the space based system, the nuclear pebble bed reactor 300, the thermoelectric generator 400, and the electric motor 500 have an annular configuration.

Extremely high electromagnetic field intensity (rate of energy flow per unit area) values of $10^{24}$ Watts/m² (and higher) can be generated with the inventive concept at hand. Furthermore, using a specially engineered geometrical configuration (a sharp end protrusion 125 out of the shell) in conjunction with the terrestrial (land) or sea based systems, by coupling the Piezoelectric Effect with the Mossbauer Effect (the recoilless emission of gamma rays due to high frequency oscillations/vibrations of the shell), it is possible to generate a Cyclonic Plasma shield, which would greatly amplify the produced electromagnetic field intensity (hence the shielding effects).

The shell 100, 105, 110 may further include embedded radioactive elements, such that high frequency vibrations generate high energy gamma rays. The shell 100, 105, 110 may be fabricated from epoxy-ceramic composite embedded within an aluminum matrix. Embedded within the shell 100, 105, 110 are crystal modules that are made from polycrystalline ferroelectric ceramic material. In the preferred embodiment, the ceramic material is lead zirconate titanate (PZT) which has been polarized. In operation, voltage from the electric motor 500 is applied to the PZT crystal modules, which generates mechanical vibrations of the shell, further inducing an output voltage at the natural resonant frequency of the crystal modules. For optimal results, the inside of the shell is pressurized to about 20 bar with dry and purified sulfur hexafluoride or mixtures of nitrogen and carbon dioxide.

As shown in FIG. 1, in the spherical shell embodiment or space based configuration of the invention, all the elements of the electromagnetic field generator 10 may be housed or disposed within the shell 100. As a result, the elements of the electromagnetic field generator 10 with a spherical shell 100 do not exhibit or are affected by the electrostatic field which is built up on the shell surface due to the high voltage electrical charging. Therefore, the entire electromagnetic energy flux density is directed outward of the shell 100, for maximum EM linear momentum density-driven deflection of an object, such as, but without limitation, an earth bound asteroid or any type of incoming object or projectile.

As shown in FIGS. 1 and 2, the spherical shell embodiment may also include a support structure 101 to mount all the elements within the spherical sphere 100. The support structure 101 may be coupled using low friction bearings 102 so that the support structure 101 along with all the elements within the spherical sphere 100 can rotate within the spherical sphere 100. The electric motor 500 imparts mechanical power via its drive shaft to a cruciform strut framework 103, which is directly attached to the inside of the spherical shell 100. Since the spherical shell 100 exhibits a high electrical charge, in the preferred embodiment, the strut framework 103 is made out of non-electrically conducting material which possesses high yield strength, such as a tightly packed network of grapheme and carbon nanotubes or carbon reinforced graphite epoxy composite. However, any type of material that is practicable can be utilized. Additive manufacturing techniques may be used for fabricating this structure.

In another embodiment of the invention, the ceramic-aluminum composite material of the spherical shell 100 may be doped with radioactive elements, such as, but without limitation, Cobalt-57, Iron-57, or any other radioactive metal element that is practicable. High frequency vibrations of the shell will consequently induce the Mossbauer Effect, namely the recoilless emission of gamma rays. This embodiment may also be used with the hemispherical shell 105 and the disc shell 110.

The spherical shell embodiment or space based configuration of the invention may also include an auxiliary propulsion unit (not shown) for guiding the apparatus to the region of perceived threat. The auxiliary propulsion unit may be chemical, nuclear based, or any type of propulsion unit practicable. The auxiliary propulsion unit may be housed or enclosed in a Faraday-type cage. Since there is no counter-torque mechanism provided for the spinning shell, the apparatus will experience a curvilinear translation (displacement due to conservation of angular momentum) similar to a spinning top. The auxiliary propulsion unit can take advantage of this motion in executing maneuvers. In another embodiment (not shown), it is also possible to eliminate the system's displacement from a fixed point in space, by having the spherical shell 100 be two counter-rotating hemispherical shells.

Figure 3:
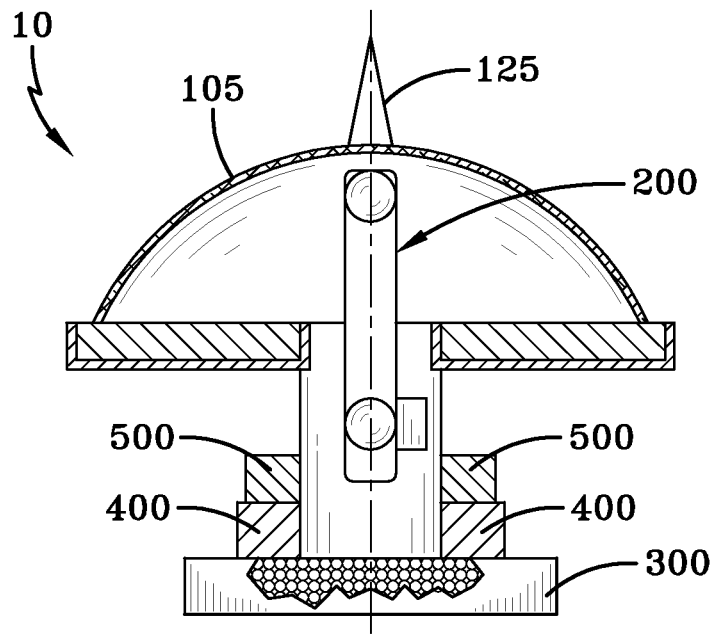
FIG. 3 is a cross-sectional side view of an electromagnetic field generator utilizing a hemispherical shell; and, FIG. 4 is a cross-sectional side view of an electromagnetic field generator utilizing a disc shell.
Figure 4:
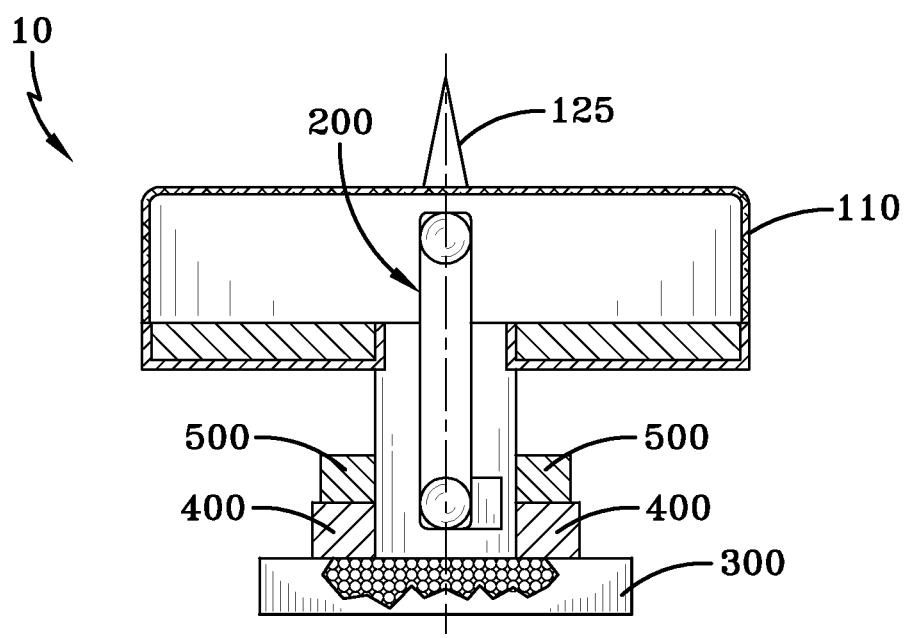

As shown in FIGS. 3 and 4, in the preferred embodiments as described earlier, both the hemispherical shell 105 and the disc shell 110 may have a sharp point protrusion or spike 125 extending from the shell 105, 110. In operation, in the immediate area of the protrusion or spike 125, the air is subjected to a great deal of electrostatic stress, which then ionizes the air. The electromagnetic fields that are generated by the apparatus 10 then accelerate the ionized air, thus inducing corona (electric, ionic) winds which are further augmented by the entrainment of neutral air around the ionized region. The ionized air and neutral air are mixed, and the mixed air starts to rotate resulting in a cyclonic plasma, which creates an additional shield for the shell 105, 110. For the land and sea based systems the nuclear power plant may be replaced with a gas turbine engine. However, in all the embodiments of the current invention, any type of power plant practicable can be utilized.

The preferred electrostatic generator(s) 200 is a Pelletron type, and may be a modified Van de Graaff generator. In a Pelletron generator, the charging belt is replaced with a chain made of metal pellets or plates connected by insulating links, whereby the metal plates are charged using the effect of influence in an electrical field.

Quantum Vacuum Plasma (QVP) is the electric glue of our plasma Universe. The Casimir Effect, the Lamb Shift, and Spontaneous Emission, are specific confirmations of the existence of QVP. It is important to note that in region(s) where the apparatus-generated electromagnetic fields are strongest, the interactions with the QVP are more potent, therefore, the higher the induced energy density of the QVP particles which spring into existence (the Dirac Sea of electrons and positrons). These QVP particles form an additional defensive layer around the system, thus augmenting the shielding effects (even though they are short-lived, these "virtual" particles have a real effect). In operation, the high energy electromagnetic fields, created by the system, interact strongly with the Vacuum Energy Field (the aggregate state of all quantum fields' fluctuations superposition), and locally disrupt Spacetime. Contributions to the Vacuum Energy Density are made by the Quantum Vacuum-Zero Point Fluctuations, the Quantum Chromo-Dynamics gluon and quark condensates, and the newly discovered Higgs Field (exhibiting massive 126 GeV particles), among other yet undiscovered fields (arising from Super-Symmetry).

The primary physical equation which describes the maximum intensity achieved by the system is described by the magnitude of the Poynting vector, and in relativistic form (derived using relativistic electrodynamics/electromagnetic field theory) can be written as:

$$S_{max} = f_G \gamma^2 (\sigma^2/\varepsilon_0)[R_r\omega + R_\nu \nu + v_R] \quad \text{(Equation 1)}$$

where $f_G$ is the geometric shape factor (equal to ⅔ for spherical shell, ⅙ for hemispherical shell and 1 for disc), $\gamma$ is the relativistic 'stretch' factor 'gamma,' $\sigma$ is the surface charge density (total charge divided by surface area), $\varepsilon_0$ is the electrical permittivity of free space, $R_r$ is the radius of rotation, $\omega$ is the angular frequency of rotation in rads/s, $R_\nu$ is the vibration (harmonic oscillation) amplitude, $\nu$ is the angular frequency of vibration in Hertz, and the term $v_R$ is the curvilinear translation speed (acquired via a propulsive unit attached to the system, or by the system itself if not equipped with a counter-torque mechanism, similar to the curvilinear motion of a spinning top). Therefore, for example, and without limitation, if we consider only rotation, given a spherical shell configuration, with $\sigma$=50,000 Coulombs/m$^2$, a spherical shell (spinning/axially rotating) radius of 2 m and an angular speed of 30,000 RPM, we can generate an electromagnetic (EM) field intensity ($S_{max}$=rate of energy flow per unit area) value of $10^{24}$ Watts/m$^2$ (this value does not account for any QVP interactions which would amplify it). Furthermore, if we simultaneously couple the high frequency of rotation with high vibration (abrupt pulsations/harmonic oscillations) frequencies in the range of $10^9$ to $10^{18}$ Hertz (and above) we can obtain $S_{max}$ intensity values in the range $10^{24}$ to $10^{28}$ Watts/m$^2$ (and beyond). These extremely high electromagnetic field intensity values emphasize the novelty of this concept, especially suited for deflection of Earth-bound asteroids.

For the case of an accelerating angular frequency of vibration ($a_{max}=R_\nu \nu^2$), neglecting rotation and curvilinear translation, Equation 1 becomes (note the intrinsic significance of angular vibration acceleration):

$$S_{max} = f_G \gamma^2 (\sigma^2/\varepsilon_0)[(R_\nu \nu^2) t_{op}] \quad \text{(Equation 2)}$$

where $t_{op}$ is the operational time for which the charged electrical system is accelerating. Strong local interaction with the high energetics of the Quantum Vacuum fields' fluctuations superposition (macroscopic Vacuum Energy state) is possible in a laboratory environment, by application of high frequency gyration and/or high frequency vibration of minimally charged objects (of unit order), in an acceleration mode. In this manner, a high degree of Vacuum Energy polarization can be achieved.

Force and Matter Fields Unification is feasible with the invention at hand, due to the extremely strong interactions (electromagnetic in nature) between ordinary matter and the Quantum Vacuum Plasma/Vacuum Energy Field (interactions which exhibit extremely high energies on Planck length scales in the immediate proximity of the shell surface). These interactions are induced by the simultaneous coupling of hyper-frequency of axial rotation (spin) and hyper-frequency of vibration (harmonic oscillations/pulsations) of electrically charged systems.

Up to this point in time, the method of choice to protect Earth from an impact or air-burst meteor event is a kinetic impactor. In the case of Apophis (a potentially dangerous known asteroid), consider its mass ($M_A$) on the order of $10^{10}$ kg, while the mass of the envisioned spacecraft ($M_{KI}$) which acts as kinetic impactor is on the order of $10^3$ kg. From conservation of linear momentum we can write:

$$(M_A + M_{KI})\Delta v = k(M_{KI})(u_{KI}) \quad \text{(Equation 3)}$$

where $\Delta v$ is the deflection speed of the asteroid once the impactor spacecraft collides with it, while $u_{KI}$ is the relative speed of the kinetic impactor with respect to the asteroid; and k is the impact coefficient (which is taken as 1, namely 100% impact effectiveness is considered). Using the nominal value for $u_{KI}$ of 10 km/s, the deflection speed is calculated as 0.001 m/s. In case of the high energy EM field-generating system, the right hand side of Equation 3 becomes $[(S_{max}/c^2)Vol_S]$, where c is the speed of light in free space, therefore, using an $S_{max}$ value of $10^{24}$ W/m² (readily achievable, as previously shown) and a system volume ($Vol_S$) of $10^3$ m³, the deflection speed becomes 1 m/s, a three orders of magnitude improvement.

The method for generating an ultrahigh intensity electromagnetic field includes charging a shell with embedded polycrystalline ferroelectric ceramic material such that the material has strong Piezoelectric Effect properties thus inducing high frequency vibrations, generating thermal power, converting the thermal power to electrical energy, and spinning the charged shell via the electrical energy such that an electromagnetic field is generated.

The space based variant of the invention comes in a spherical shell configuration (shown in FIGS. 1 and 2). What is most novel in this configuration is that all the subsystems are housed within this shell, and hence do not exhibit or are affected by the electrostatic field which is build up on the shell surface due to the high voltage electrical charging (the electric field E being zero inside the shell). Hence the entire electromagnetic (EM) energy flux density (temporal rate of change of energy flow per unit area of shell) is directed outward of the shell, for maximum EM linear momentum density-driven deflection of an Earth-bound 'Killer' Asteroid.

The maximum linear momentum density is the maximum generated EM intensity divided by the speed of light squared (Smax/c²). Thus, the physical 'push' against the asteroid (or any other incoming threat) is still quite sizeable, to say the least (given $S=10^{24}$ W/m²). Such high values of EM energy flux (S) are feasible by controlled accelerated motion (preferably accelerated spin and/or accelerated vibration) of electrically charged matter, subjected to rapid acceleration transients, as described in the inventor's published peer-reviewed paper titled "The high energy electromagnetic field generator," *International Journal of Space Science and Engineering*, vol. 3, no. 4, pp 312-317 (2015). This paper is incorporated by reference to the specification. As described earlier and shown in FIGS. 1 and 2, in the preferred embodiment the principal components of the high energy electromagnetic field generator 10 are housed within the spherical shell are: two high charge electrostatic generators 200 (to rapidly charge up the spherical shell to the high voltages required for optimal operation); a nuclear fission Pebble Bed Reactor 300 to act as the primary thermal power source; a thermoelectric generator 400 to convert the reactor generated heat energy to electrical energy necessary to power a high speed electric motor 500, as well as energize the DC voltage sources which power up the electrostatic generators and supply the input voltage for the Piezoelectric Effect to manifest itself by mechanical vibrations induced in the PZT crystals embedded in the Aluminum matrix composite shell. This motor 500 imparts rotation to a cruciform strut structure directly connected to the spherical shell 100, consequently spinning it at high angular speeds. An integrated subsystems-insulated support structure 101 can be used to mount all the high energy electromagnetic field generator 10 subsystems. It would rotate with the spherical shell 100 to which it is coupled using low friction bearings. Note that a counter-torque mechanism (for angular momentum conservation) is not provided, which creates the curvilinear translation speed term specified in the $S_{max}$ equation.

A chemical or nuclear energy-based auxiliary propulsion unit (not shown) is necessary to guide the spherical shell system close enough to the asteroid (or other space-based threat) so as to bring about the full effect of the high energy electromagnetic field generator 10. As described earlier, this unit can be enclosed in a Faraday-type cage. Since there is no counter-torque mechanism provided for the spinning shell, the apparatus will experience a curvilinear translation (displacement due to conservation of angular momentum) similar to a spinning top. The auxiliary propulsion unit can take advantage of this motion in executing maneuvers. It is also possible to eliminate the system's displacement from a fixed point in space, by having the spherical shell 100 be composed of two counter-rotating hemispherical shells. The two electrostatic generators are of the Pelletron type, namely a modified Van de Graaff (VG) generator, in which the charging belt is replaced with a chain made up of metal pellets (or plates) connected by insulating nylon links, whereby the metal plates are charged using the effect of influence in an electrical field. Much higher voltages (than with the VG), up to and possibly exceeding 30 MV (megavolts) can be achieved with DC voltage sources of up to 50 kV (kilovolts). For the charging to be optimal, the inside of the spherical shell 100 would have to be pressurized to 20 bar with dry and purified sulfur hexafluoride (SF6) or mixtures of nitrogen and carbon dioxide (80% N2 and 20% CO2). It is imperative that these generators can be effectively modularized and miniaturized, which can be achieved with recent advances in computerized additive manufacturing techniques such as rapid prototyping and 3-D printing.

The fission reactor which provides the thermal power to the thermoelectric generator 400 is a pebble bed reactor (PBR) 300 which uses small tennis size uranium balls (9 grams of U238 per pebble) in a small, modular and inherently safe compact package (which uses demonstrated nuclear technology, hence high TRL level is possible), to deliver 1 to 10 MW (megawatts) of power, depending on the desired system EM field intensity. The pebble bed reactor 300 is Helium cooled and features a closed system (subsystems used for removal of excess heat from the Helium working gas and its recirculation back into the pebble bed reactor 300 must be accounted for). The heated Helium used by the PBR power plant is introduced through the turbine (not shown) of the thermoelectric generator (not shown, since it is well known in the art) which spins the electric generator (not shown) to which it is coupled by a common shaft.

A high speed, variable drive, electric motor 500 (which is powered by the thermoelectric generator coupled to the nuclear power plant) imparts mechanical power via its drive shaft to a cruciform strut framework which is directly attached to the inside of the spherical shell 100 structure. Since the spherical shell 100 exhibits a high electrical charge, the strut framework is made out of non-electrically conducting material which possesses high yield strength, such as a tightly packed network of grapheme and carbon nanotubes or carbon reinforced graphite epoxy composite. Additive manufacturing techniques may be used for fabricating this structure.

In the preferred embodiment, the spherical shell's 100 morphology is that of an epoxy-ceramic powder (C-ply) composite material embedded within an aluminum matrix. This composition provides both the high electrically conducting property of aluminum as well as the high capacitance of the epoxy-ceramic composite. Given that electrical charge (Q) is the product of capacitance (C) and voltage (V), in order to avoid corona discharge due to initiation of electrical breakdown (for the terrestrial applications of this invention) the electrical field in dry air must be kept below $3 \times 10^6$ V/m (in the vacuum of space this value climbs to $10^9$ V/m); hence it order to produce an ultrahigh charge, the capacitance must be quite high. For the spherical shell 100 geometry we have $C=4\pi\varepsilon_0\varepsilon_r R$, where R is the spherical shell radius, $\varepsilon_0$ is the electrical permittivity of free space and $\varepsilon_r$ is the relative dielectric constant, which in case of the C-ply material is on the order of $10^{18}$. Once again, additive manufacturing techniques can be used for fabricating this structure.

In order to produce the vibrations (harmonic oscillations) necessary for the ultrahigh energy intensities generated by the pebble bed reactor 300, the spherical shell 100 also features embedded polycrystalline ferroelectric ceramic material, namely lead zirconate titanate (PZT) which has been polarized in order to exhibit very strong Piezoelectric Effect properties. Voltage applied (from the DC voltage sources, not shown) to the PZT crystal modules, generates mechanical vibrations of the spherical shell 100, further inducing an output voltage at the natural resonant frequency of the crystal. It is important to decouple this vibrational frequency from any resonant frequency of the shell/disc structural framework, which may cause diminution of structural integrity. By further doping the ceramic-aluminum composite material of the spherical shell 100 with radioactive metal elements, such as Cobalt-57 or Iron-57, it is possible to induce the Mossbauer Effect, namely the recoilless emission of gamma rays (high energy photons) due to the presence of an oscillating source (provided by the PZT crystal module vibrations; or a Radio frequency (RF)/Microwaves-driven oscillating source, if this is considered preferential to the Piezoelectric Effect). The Mossbauer Effect would amplify the EM energy intensities generated by our system to even greater values (high energy photons carry relativistic momentum). The oscillating source can also be driven by radio frequency/microwaves, bounced within a resonant cavity, in the manner specified in a paper written by D. A. Brady (D. A. Brady et al., "Anomalous thrust Production from an RF Test Device, measured on a low thrust torsion pendulum," AIAA/ASME/SAE/ASEE Joint Propulsion Conference, AIAA 2014-4029), rather than by the PZT-induced Piezoelectric Effect.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A high energy electromagnetic field generator, comprising:
    a shell, the shell having embedded polycrystalline ferroelectric ceramic material, the material being polarized such that the ceramic material exhibits strong Piezoelectric Effect properties thus inducing high frequency vibrations;
    an electrostatic generator for charging up the shell, the electrostatic generator disposed within the shell;
    a power plant to generate thermal power;
    a thermoelectric generator to convert the thermal power generated by the power plant to electrical energy;
    an electric motor powered by the electrical energy generated by the thermoelectric generator, the electric motor supplying input voltage such that the shell spins at high angular speeds, vibrates at high frequencies, and generates an electromagnetic field.

2. The apparatus of claim 1, wherein the shell is spherical.

3. The apparatus of claim 2, wherein high energy electromagnetic field generator includes two electrostatic generators.

4. The apparatus of claim 3, wherein the two electrostatic generators, the power plant, the thermoelectric generator, and the electric motor are disposed within the spherical shell.

5. The apparatus of claim 3, wherein the shell further includes embedded radioactive elements, such that high frequency vibrations generate high energy gamma rays.

6. The apparatus of claim 1, wherein the shell is hemispherical.

7. The apparatus of claim 6, wherein the shell further includes embedded radioactive elements, such that high frequency vibrations generate high energy gamma rays.

8. The apparatus of claim 7, wherein the shell further includes a protrusion extending from the shell such that air around the protrusion is subjected to electrostatic stress and as a result becomes ionized.

9. The apparatus of claim 1, wherein the shell is a disc.

10. The apparatus of claim 9, wherein the shell further includes a protrusion extending from the shell such that air around the protrusion is subjected to electrostatic stress and as a result becomes ionized.

11. The apparatus of claim 9, wherein the shell further includes embedded radioactive elements, such that high frequency vibrations generate high energy gamma rays.

12. A method for generating a ultrahigh intensity electromagnetic field, the method comprising:
    charging a shell with embedded polycrystalline ferroelectric ceramic material such that the material has strong Piezoelectric Effect properties thus inducing high frequency vibrations;
    generating thermal power;
    converting the thermal power to electrical energy; and,
    spinning the charged shell via the electrical energy such that an electromagnetic field is generated.

* * * * *